United States Patent
Bosch et al.

(10) Patent No.: US 9,392,025 B2
(45) Date of Patent: Jul. 12, 2016

(54) SUBSCRIBER DEPENDENT REDIRECTION BETWEEN A MOBILE PACKET CORE PROXY AND A CELL SITE PROXY IN A NETWORK ENVIRONMENT

(71) Applicant: CISCO TECHNOLOGY, INC., San Jose, CA (US)

(72) Inventors: Hendrikus G. P. Bosch, Aalsmeer (NL); Humberto J. La Roche, Ocean, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 306 days.

(21) Appl. No.: 14/086,701

(22) Filed: Nov. 21, 2013

(65) Prior Publication Data

US 2015/0139041 A1 May 21, 2015

(51) Int. Cl.
*H04W 24/02* (2009.01)
*H04W 40/34* (2009.01)
*H04L 29/06* (2006.01)

(52) U.S. Cl.
CPC ............ *H04L 63/306* (2013.01); *H04W 40/34* (2013.01)

(58) Field of Classification Search
CPC ....... H04L 63/306; H04L 63/30; H04L 67/28; H04L 67/2814; H04L 29/08738; H04L 29/08747; H04W 40/34; H04W 88/182
See application file for complete search history.

(56) References Cited

U.S. PATENT DOCUMENTS

| | | | |
|---|---|---|---|
| 7,953,820 B2 * | 5/2011 | Stevens | G06F 17/30902 709/219 |
| 8,693,233 B2 | 4/2014 | Scheuerlein et al. | |
| 9,253,810 B2 | 2/2016 | Kaczmarska-Wojtania et al. | |
| 2002/0187777 A1 * | 12/2002 | Osterhout | H04M 3/54 455/417 |
| 2003/0076815 A1 | 4/2003 | Miller et al. | |
| 2004/0133683 A1 | 7/2004 | Keller et al. | |
| 2007/0162599 A1 | 7/2007 | Nguyen | |
| 2008/0305784 A1 | 12/2008 | Dillinger et al. | |
| 2009/0116477 A1 | 5/2009 | Belling et al. | |
| 2010/0098096 A1 | 4/2010 | Yang | |
| 2010/0106845 A1 | 4/2010 | Hu et al. | |
| 2010/0153561 A1 | 6/2010 | Capone et al. | |

(Continued)

FOREIGN PATENT DOCUMENTS

EP 2876914 5/2015

OTHER PUBLICATIONS

USPTO May 21, 2015 Non-Final Office Action from U.S. Appl. No. 14/086,781.

(Continued)

*Primary Examiner* — Ahmed Elallam
(74) *Attorney, Agent, or Firm* — Patent Capital Group

(57) ABSTRACT

A method is provided in one example embodiment and includes receiving, by a first proxy within an access network, a first request for content associated with a remote server. The first request includes a subscriber identifier associated with a subscriber. The method further includes sending the first request to a second proxy within a core network. The first request is intercepted by an intercept function within the core network in a first intercept operation. The intercept function is configured to forward the first request to the second proxy. The method further includes receiving a redirect from the second proxy. The redirect is configured to redirect the first request to the first proxy. The redirect is intercepted by the intercept function in a second intercept operation, and the intercept function is configured to forward the redirect to the first proxy.

48 Claims, 7 Drawing Sheets

(56) References Cited

U.S. PATENT DOCUMENTS

| | | | |
|---|---|---|---|
| 2011/0028120 A1 | 2/2011 | Wu | |
| 2011/0051683 A1 | 3/2011 | Ramankutty et al. | |
| 2011/0070906 A1 | 3/2011 | Chami et al. | |
| 2011/0310731 A1 | 12/2011 | Park et al. | |
| 2012/0082093 A1 | 4/2012 | Andreasen et al. | |
| 2012/0082094 A1 | 4/2012 | Andreasen et al. | |
| 2012/0082132 A1 | 4/2012 | Andreasen et al. | |
| 2012/0084388 A1 | 4/2012 | De Foy et al. | |
| 2012/0102174 A1 | 4/2012 | Zhou et al. | |
| 2012/0173661 A1 | 7/2012 | Mahaffey et al. | |
| 2012/0209942 A1* | 8/2012 | Zehavi | H04L 29/08729 709/213 |
| 2013/0007286 A1* | 1/2013 | Mehta | H04W 76/02 709/227 |
| 2013/0016677 A1 | 1/2013 | Kunz et al. | |
| 2013/0018978 A1* | 1/2013 | Crowe | H04L 67/2842 709/214 |
| 2013/0097309 A1 | 4/2013 | Ma et al. | |
| 2013/0173756 A1* | 7/2013 | Luna | H04L 43/0876 709/219 |
| 2014/0051437 A1 | 2/2014 | Diachina et al. | |
| 2014/0064177 A1 | 3/2014 | Anchan | |
| 2014/0064249 A1 | 3/2014 | Lee et al. | |
| 2014/0233384 A1 | 8/2014 | Howard | |
| 2014/0241158 A1 | 8/2014 | Anthony et al. | |
| 2014/0378105 A1 | 12/2014 | Suryavanshi | |
| 2015/0139075 A1 | 5/2015 | Bosch et al. | |
| 2015/0139084 A1 | 5/2015 | Kaczmarska-Wojtania et al. | |
| 2015/0139085 A1 | 5/2015 | Kaczmarska-Wojtania et al. | |

OTHER PUBLICATIONS

USPTO Jun. 29, 2015 Non-Final Office Action from U.S. Appl. No. 14/086,734.

EPO Jun. 3, 2015 Extended Search Report and Written Opinion from European Application Serial No. 14194359.

U.S. Appl. No. 14/086,781, filed Nov. 21, 2013, entitled "Providing In-Line Services Through Radio Access Network Resources Under Control of a Mobile Packet Core in a Network Environment," Inventors: Malgorzata Kaczmarska-Wojtania, et al.

U.S. Appl. No. 14/086,734, filed Nov. 21, 2013, entitled "Providing Cellular-Specific Transport Layer Service by Way of Cell-Site Proxying in a Network Environment," Inventors: Hendrikus G. P. Bosch, et al.

U.S. Appl. No. 14/086,754, filed Nov. 21, 2013, entitled "Localizing a Mobile Data Path in a Radio Access Network Under Control of a Mobile Packet Core in a Network Environment," Inventors: Malgorzata Kaczmarska-Wojtania, et al.

"AAA protocol," Wikipedia, the free encyclopedia, Feb. 13, 2014, 4 pages. http://en.wikipedia.org/w/index.php?title=AAA_protocol&oldid=595247372.

"GPRS core network," Wikipedia, the free encyclopedia, Mar. 15, 2014, 10 pages, http://en.wikipedia.org/w/index.php?title=GPRS_core_network&oldid=599684316.

"GPRS Tunnelling Protocol," Wikipedia, the free encyclopedia, Feb. 13, 2014, 11 pages, http://en.wikipedia.org/w/index.php?title=GPRS_Tunnelling_Protocol&oldid=595292488.

"Lawful Interception," Wikipedia, the free encyclopedia, Dec. 24, 2013, 11 pages http://en.wikipedia.org/w/index.php?title=Lawful_interception&oldid=587527305.

"Proxy Server," Wikipedia, the free encyclopedia, Mar. 17, 2014, 21 pages http://en.wikipedia.org/w/index.php?title=Proxy_serve&oldid=600031885.

GPP-TS-29.281-V9.2.0 (Mar. 2010), 3rd Generation Partnership Project; Technical Specification Group Core Network and Terminals; General Packet Radio System (GPRS) Tunnelling Protocol User Plane (GTPv1-U) (Release 9), 3GPP Organizational Partners, Mar. 2010, 24 pages.

USPTO Apr. 23, 2015 Non-Final Office Action from U.S. Appl. No. 14/086,754.

USPTO Nov. 25, 2015 Non-Final Office Action from U.S. Appl. No. 14/086,781.

USPTO Jan. 13, 2016 Non-Final Office Action from U.S. Appl. No. 14/086,734.

USPTO Oct. 5, 2015 Notice of Allowance from U.S. Appl. No. 14/086,754.

U.S. Appl. No. 14/989,133, filed Jan. 6, 2016, entitled "Localizing a Mobile Data Path in a Radio Access Network Under Control of a Mobile Packet Core in a Network Environment," Inventors: Malgorzata Kaczmarska-Wojtania, et al.

* cited by examiner

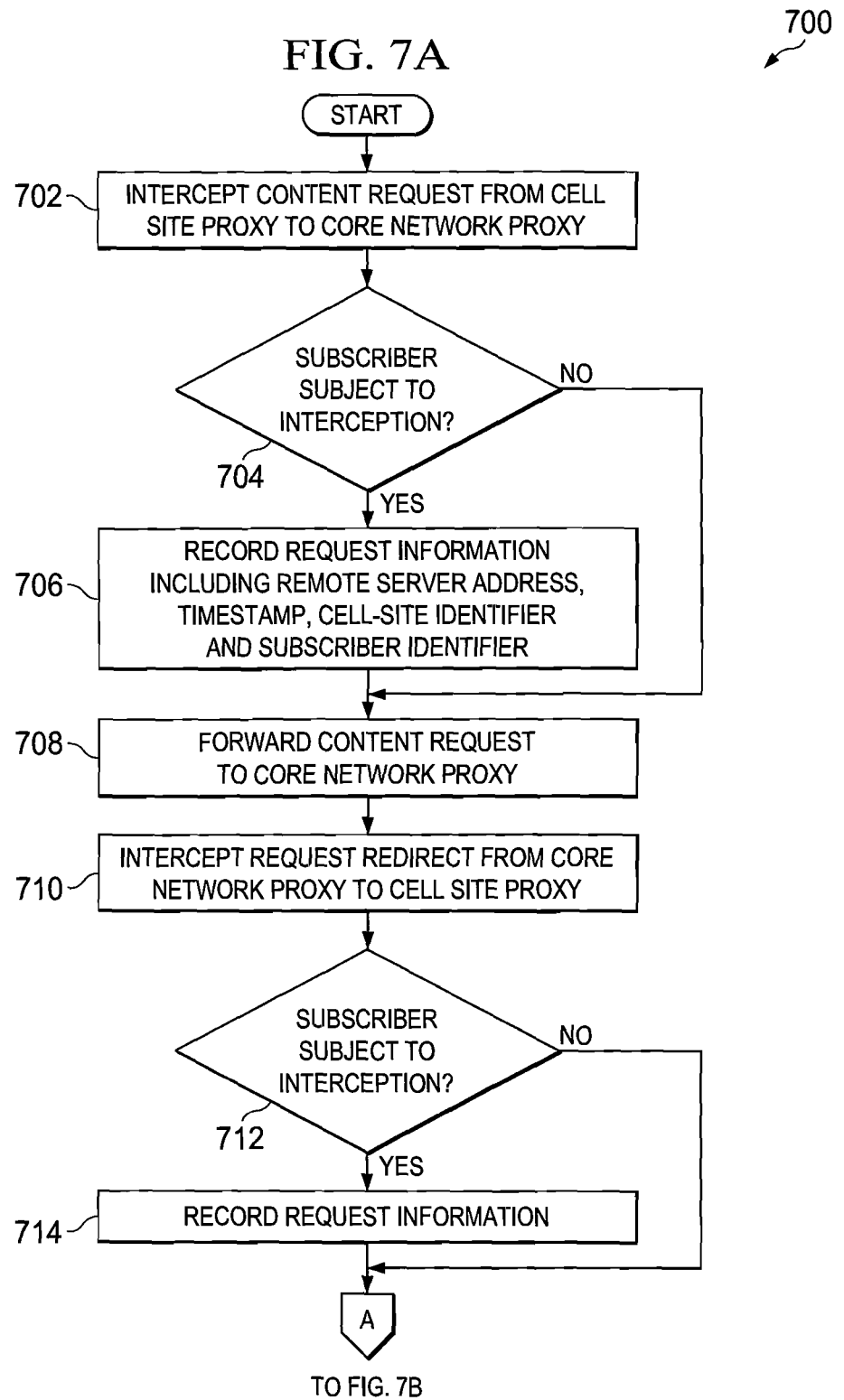

2
SUBSCRIBER DEPENDENT REDIRECTION BETWEEN A MOBILE PACKET CORE PROXY AND A CELL SITE PROXY IN A NETWORK ENVIRONMENT

TECHNICAL FIELD

This disclosure relates in general to the field of communications and, more particularly, to subscriber dependent redirection between a mobile packet core proxy and a cell site proxy in a network environment.

BACKGROUND

Some cellular Radio Access Network (RAN) vendors are exploring procedures by which base stations at a cell site can host virtual machines with applications to "enhance" service delivery and quality of experience of data served towards mobile subscriber. In these systems, GTP-encapsulated IP packets sent to and received from a mobile node are routed through one or more services operating in the base station. These services may, for example, only observe the packet flow or even alter the packet flow if this improves the quality of experience for the mobile subscriber, the mobile service provider or both. An example of these services is a Hypertext Transfer Protocol (HTTP) web cache. When a web cache is deployed in a base station, web requests that "hit" in this cache do not lead to the transmission of data over the backhaul. The benefits are twofold: if the backhaul is loaded, the mobile subscriber can still obtain data at rates only limited by the performance of the cellular channel. By using a base station cache, the mobile service provider can ease loading on its backhaul and thus reduce operational or capital expenditures on said link.

Yet, a mobile service provider has a legal requirement to enable the authorities to intercept all traffic sent to and received from a mobile subscriber operating on its cellular network. All such data is transmitted through a lawful intercept function hosted in a secure compute and/or network element in the cellular packet core and operated by trusted personnel. A lawful intercept function creates a facsimile of all data received and transmitted for those subscribers subject to lawful intercept and records their data in a secure location, including a time stamp of the operation and a cell-site identifier connecting the mobile node. To make certain no overt channel exist, all data served to and from the mobile node may be sent through the lawful intercept function, including the data for mobile subscribers not subject to lawful interception as the lawful intercept function may operate as a "black box." A base station is not usually considered a secure location, and as such should not host the lawful intercept function itself.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 7A-7B is a simplified flow diagram illustrating potential operations associated with the lawful intercept function according to one embodiment of the present disclosure.

DETAILED DESCRIPTION OF EXAMPLE EMBODIMENTS

Overview

Figures 1, 2:
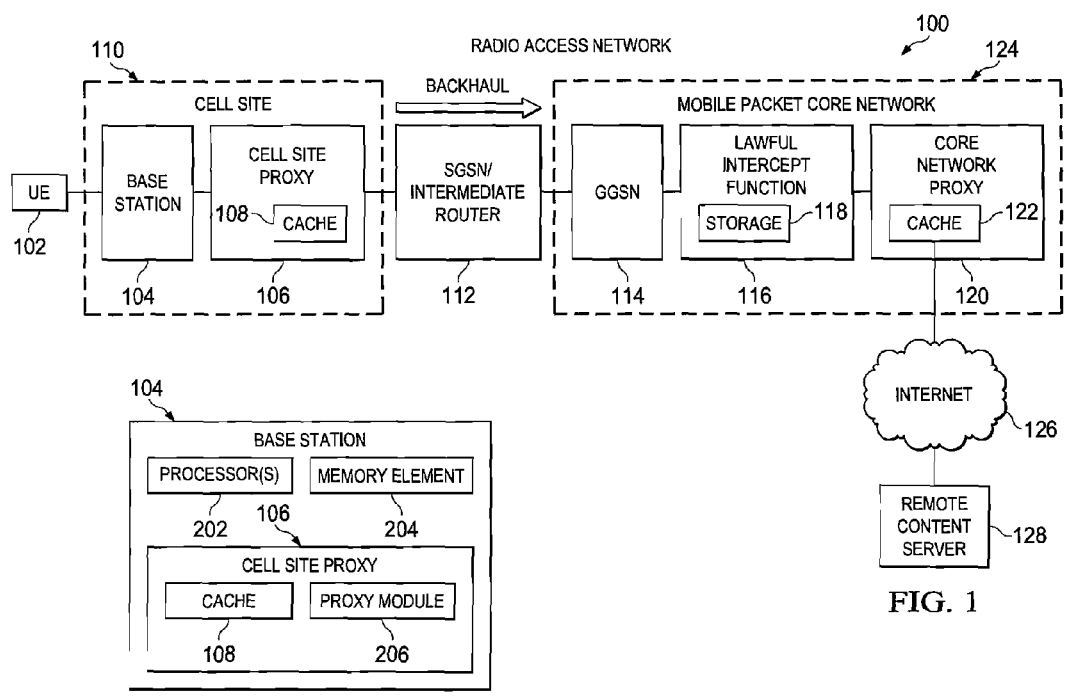
FIG. 1 is a simplified block diagram of an example embodiment of a communication system for subscriber dependent redirection between a mobile packet core proxy and a cell site proxy in a network environment in a network environment.
FIG. 2 is a simplified block diagram illustrating a particular embodiment of the base station of the communication system of FIG. 1.

A method is provided in one example embodiment and includes receiving, by a first proxy within an access network, a first request for content associated with a remote server. The first request includes a subscriber identifier associated with a subscriber. The method further include sending the first request to a second proxy within a core network. The first request is intercepted by an intercept function within the core network in a first intercept operation. The intercept function is configured to forward the first request to the second proxy. The method further includes receiving a redirect from the second proxy. The redirect is configured to redirect the first request to the first proxy. The redirect is intercepted by the intercept function in a second intercept operation, and the intercept function is configured to forward the redirect to the first proxy.

In a particular embodiment, the first intercept operation includes determining if the subscriber is subject to interception, and recording request information associated with the request if the subscriber is subject to interception. In a particular embodiment, the determining if the subscriber is subject to interception is based upon the subscriber identity. In still another particular embodiment, the request information includes at least one of the subscriber identity, a time stamp associated with the request, and a cell site identifier identifying a cell site associated with the first proxy. In a particular embodiment, the first proxy includes a cache configured to store content from the remote server.

In another particular embodiment, the method further includes determining if the requested content is found in the cache, and sending the content from the cache to user equipment associated with the subscriber identity if the requested content is found in the cache. In still another particular embodiment, the method further includes receiving the requested content from the second proxy. The requested content is intercepted by the intercept function in a third intercept operation, and the intercept function being configured to pass the requested content to the first proxy. In a more particular embodiment, the third intercept operation includes determining if the subscriber is subject to interception and recording the requested content if the subscriber is subject to interception. In still another particular embodiment, the first proxy is a web proxy.

One or more non-transitory tangible media is provided in one example that includes code for execution and when executed by a processor operable to perform operations including receiving, by a first proxy within an access network, a first request for content associated with a remote server. The first request includes a subscriber identifier associated with a subscriber. The operations further include sending the first request to a second proxy within a core network. The first request is intercepted by an intercept function within the core network in a first intercept operation, and the intercept function configured to forward the first request to the second proxy. The operations still further include receiving a redirect from the second proxy. The redirect is configured to redirect the first request to the first proxy, and the redirect is intercepted by the intercept function in a second intercept operation. The intercept function is configured to forward the redirect to the first proxy.

An apparatus is provided in one example that includes a memory element configured to store data, a processor operable to execute instructions associated with the data, and at least one module. The at least one module is configured to receive, by a first proxy within an access network, a first request for content associated with a remote server. The first request includes a subscriber identifier associated with a subscriber. The at least one module is further configured to send the first request to a second proxy within a core network. The first request is intercepted by an intercept function within the core network in a first intercept operation. The intercept function is configured to forward the first request to the second proxy. The at least one module is further configured to receive a redirect from the second proxy. The redirect is configured to redirect the first request to the first proxy. The redirect is intercepted by the intercept function in a second intercept operation. The intercept function is configured to forward the redirect to the first proxy.

A method is provided in another example that includes intercepting, by a first proxy in a core network, a first request for content from a second proxy within an access network. The first request includes a request for content from a remote server and a subscriber identifier associated with a subscriber. The first request is intercepted by an intercept function within the core network in a first intercept operation. The intercept function is configured to forward the first request to the first proxy. The method further includes sending a redirect to the second proxy. The redirect is configured to redirect the first request to the second proxy. The redirect is intercepted by the intercept function in a second intercept operation. The intercept function is configured to forward the redirect to the second proxy.

In a particular embodiment, the first intercept operation includes determining if the subscriber is subject to interception, and recording request information associated with the request if the subscriber is subject to interception. In a more particular embodiment, the determining if the subscriber is subject to interception is based upon the subscriber identity. In a more particular embodiment, the request information includes at least one of the subscriber identity, a time stamp associated with the request, and a cell site identifier identifying a cell site associated with the first proxy. In a more particular embodiment, the first proxy includes a cache configured to store content from the remote server.

In a more particular embodiment, the method further includes determining if the requested content is found in the cache, and receiving the requested content from the remote server if the requested content is not found in the cache.

In a more particular embodiment, the method further includes sending the requested content to the second proxy.

The requested content is intercepted by the intercept function in a third intercept operation. The intercept function is configured to pass the requested content to the second proxy. In still another particular embodiment, the third intercept operation includes determining if the subscriber is subject to interception, and recording the requested content if the subscriber is subject to interception. In still another embodiment, the first proxy is a web proxy.

One or more non-transitory tangible media are provided in another example that includes code for execution and when executed by a processor operable to perform operations including intercepting, by a first proxy in a core network, a first request for content from a second proxy within an access network. The first request includes a request for content from a remote server and a subscriber identifier associated with a subscriber. The first request is intercepted by an intercept function within the core network in a first intercept operation. The intercept function is configured to forward the first request to the first proxy. The operations further include sending a redirect to the second proxy. The redirect is configured to redirect the first request to the second proxy. The redirect is intercepted by the intercept function in a second intercept operation. The intercept function is configured to forward the redirect to the second proxy.

An apparatus is provided in another example and includes a memory element configured to store data, a processor operable to execute instructions associated with the data, and at least one module. The at least one module is configured to intercept, by a first proxy in a core network, a first request for content from a second proxy within an access network. The first request includes a request for content from a remote server and a subscriber identifier associated with a subscriber. The first request is intercepted by an intercept function within the core network in a first intercept operation. The intercept function is configured to forward the first request to the first proxy. The at least one module is further configured to send a redirect to the second proxy. The redirect is configured to redirect the first request to the second proxy. The redirect is intercepted by the intercept function in a second intercept operation. The intercept function is configured to forward the redirect to the second proxy.

A method is provided in another example and includes intercepting, by a first proxy in a core network, a first request for content from a second proxy within an access network. The first request includes a request for content from a remote server and a subscriber identifier associated with a subscriber. The first request is intercepted by an intercept function within the core network in a first intercept operation. The intercept function is configured to forward the first request to the first proxy. The method further includes sending an Hypertext Transfer Protocol (HTTP) redirect to the second proxy. The HTTP redirect is configured to redirect the first request to the second proxy. The HTTP redirect is intercepted by the intercept function in a second intercept operation and the intercept function is configured to forward the HTTP redirect to the second proxy.

Example Embodiments

Turning to FIG. 1, FIG. 1 is a simplified block diagram of an example embodiment of a communication system 100 for subscriber dependent redirection between a mobile packet core proxy and a cell site proxy in a network environment in a network environment. The particular embodiment illustrated in FIG. 1 is shown as including general packet radio service (GPRS) network elements. However, it should be understood that in other embodiments any other suitable network elements may be used. Communication system 100 of FIG. 1 includes user equipment (UE) 102. First user equipment 102a may connect wirelessly to a base station 104. In a particular embodiment, base station 104 is an Evolved Node B (eNodeB) Long-Term Evolution (LTE) base station node. In still other embodiments, base station 104 may include a high speed packet access (HSPA) base station, a, Universal Mobile Telecommunications System (UMTS) base station, or femtocell base station. Base station 104 is in further communication with a cell site proxy 106. Cell site proxy 106 includes a cell site cache 108. In one or more embodiments, a proxy is a server such as a computer system or an application that acts as an intermediary for requests from clients seeking resources from other servers. A client may connect to the proxy requesting some service, such as a file, web page, or other resource available from a remote server. An example of a proxy is a web proxy facilitating access to content on the World Wide Web. In a particular embodiment, cell site proxy 106 includes a web proxy. Base station 104 and cell site proxy 106 are each located at a cell site 110. In a particular embodiment, cell site proxy 106 is integrated with and resident on base station 104. Cell site proxy 106 is further connected to a Serving GPRS support node (SGSN), serving gateway (S-GW), and/or intermediate router 112. An SGSN, such as SGSN/intermediate router 112 may be responsible for the delivery of data packets from and to user equipment, such as user equipment 102, within its geographical service area. Its tasks may include packet routing and transfer, mobility management, logical link management, and authentication and charging functions. In one or more embodiments, base station 104, cell site proxy 106, and SGSN/intermediate router 112 are located in a radio access network (RAN). In still other embodiments, base station 104, cell site proxy 106, and SGSN/intermediate router 112 may be located in any access network. In still other embodiments, the functionality of SGSN/intermediate router 112 may be replaced with a Mobility Management Entity (MME) in an LTE network.

SGSN/intermediate router 112 may be further connected to a Gateway GPRS support node (GGSN) 114 and/or a packet gateway (PGW). GGSN 114 is in communication with a lawful intercept function 116. Lawful intercept function 116 includes storage 118. In one or more embodiments, lawful intercept function 116 is embodied in a secure network element. Lawful intercept function 116 is configured to support lawful intercept operations within communication system 100 as further described herein. Lawful Intercept is a process by which law enforcement agencies (LEAs) or other authorized entities may conduct electronic surveillance as authorized by judicial or administrative order. Increasingly, legislation is being adopted and regulations are being enforced that require service providers (SPs) and Internet service providers (ISPs) to implement their networks to explicitly support authorized electronic surveillance.

Lawful intercept function 116 is further in communication with a core network proxy 120. Core network proxy 120 includes a core network cache 122. In a particular embodiment, core network proxy includes a web proxy. In the particular embodiment illustrated in FIG. 1, GGSN 114, lawful intercept function 116, and core network proxy 120 reside in a mobile packet core network 124. In still other embodiments, one or more of GGSN 114, lawful intercept function 116, and core network proxy 120 may reside in any core network.

In a particular embodiment, GGSN 114 is responsible for the internetworking between the GPRS network and external packet switched networks such as the Internet and X.25 networks. When GGSN 114 receives data addressed to a specific mobile user, it may check if the user is active, and forward the data to the SGSN, MME, or other gateway node serving the mobile user if the user is active. If the mobile user is inactive, GGSN 114 may discard the data or initiate a paging procedure to activate the UE. On the other hand, GGSN 114 may route mobile-originated packets to the correct network. In particular embodiments, GGSN 114 is an anchor point that enables mobility of user equipment 102 in GPRS/UMTS networks and maintains routing information necessary to tunnel protocol data units (PDUs) to the SGSN that services the particular user equipment 102, e.g. a mobile station. GGSN 114 may convert GPRS packets received from SGSN/intermediate router 112 into an appropriate packet data protocol (PDP) format (e.g., IP or X.25) and send packets out on the corresponding packet data network. In addition, GGSN 114 may convert PDP addresses of incoming data packets to a GSM address of a destination user. GGSN 114 may send the readdressed packets to the responsible SGSN. GGSN 114 may further store a current SGSN address associated with a user and his or her profile in a location register of GGSN 114. GGSN 114 may further be responsible for IP address assignment and is the default router for connected user equipment (UE) 102. GGSN 114 may further perform authentication, billing/charging functions and other functions via core network services. Communication system 100 may further include a backhaul, such as an IP backhaul from the RAN to GGSN 114.

Core network proxy 120 is in further communication with the Internet 126. Communication system 100 further includes a remote content server 128 in communication with the Internet 126. In one or more embodiments, remote content server 128 is configured to host content such as media content including video, audio, textual, visual or other content to be provided to user equipment 102. In a particular embodiment, remote content server 128 includes a web server.

Each of the elements of FIG. 1 may couple to one another through simple interfaces (as illustrated), or through any other suitable connection (wired or wireless), which can provide a viable pathway for network communications. Additionally, any one or more of these elements may be combined or removed from the architecture based on particular configuration needs. Communication system 100 may facilitate transmission control protocol/Internet protocol (TCP/IP) communications for the transmission or reception of packets in a network, and may operate in conjunction with a user datagram protocol/IP (UDP/IP), or any other suitable protocol where appropriate and based on particular needs.

Communication system 100 may be connected to the 3rd Generation Partnership Project (3GPP) Evolved Packet System architecture, but alternatively this depicted architecture may be equally applicable to other environments such as a 4G LTE network. In general terms, 3GPP defines the Evolved Packet System (EPS) as specified in TS 23.401, TS.23.402, TS 23.203, etc. The EPS consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks can be performed via the evolved PDG (ePDG), which provides for IPsec security associations to the user equipment over the untrusted IP access network. The ePDG (in turn) supports mobility, policy, and AAA interfaces to the EPC, similar to the trusted IP access networks.

Note that user equipment 102 can be associated with a client, a customer, or end user wishing to initiate a communication in system 100 via some network. In one particular example, user equipment 102 reflects a device configured to generate wireless network traffic. The term 'endpoint' and 'end-station' are included within the broad term user equipment, as used herein. User equipment 102 can include a device used to initiate a communication, such as a computer, a personal digital assistant (PDA), a laptop or electronic notebook, a cellular telephone, an iPhone, a Blackberry, an Android, a smartphone, a tablet, an iPad, an IP phone, or any other device, component, element, equipment, or object capable of initiating voice, audio, video, media, or data exchanges within communication system 100. User equipment 102 may also include a suitable interface to the human user, such as a microphone, a display, or a keyboard or other terminal equipment. User equipment 102 may also be any device that seeks to initiate a communication on behalf of another entity or element, such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

For purposes of illustrating certain example techniques of communication system 100, it is important to understand the communications that may be traversing the network. The following foundational information may be viewed as a basis from which the present disclosure may be properly explained. IP networks may provide users with connectivity to networked resources such as corporate servers, extranet partners, multimedia content, the Internet, and any other application envisioned within IP networks. While these networks generally function to carry data plane (user-generated) packets, they may also implicate control plane and management plane packets.

The term packet is used to refer to data plane packets, control plane packets, and management plane packets. In general, the data plane (also known as the forwarding plane, or the user plane) provides the ability to forward data packets; the control plane provides the ability to route data correctly; and the management plane provides the ability to manage network elements. For normal IP packet processing, an IP router typically has a data plane, a control plane, and a management plane. The IP packets themselves support all of the planes for any IP-based protocol, and the IP router has no inherent knowledge about whether each IP packet is a data, control, or management plane packet.

The vast majority of packets handled by a router travel through the router via the data plane. Data plane packets typically consist of end-station, user-generated packets, which are forwarded by network devices to other end-station devices. Data plane packets may have a transit destination IP address, and they can be handled by normal, destination IP address-based forwarding processes. Service plane packets can be a special type of data plane packets. Service plane packets are also user-generated packets, which may be forwarded by network elements to other end-station devices; however, they may require high-touch handling by a network element (above and beyond normal, destination IP address-based forwarding) to properly forward the packet.

Control plane packets commonly include packets that are generated by a network element (e.g., a router or a switch), as well as packets received by the network that may be used for the creation and operation of the network itself. Control plane packets may have a receive destination IP address. Protocols that "glue" a network together, such as address resolution protocol (ARP), border gateway protocol (BGP), and open shortest path first (OSPF), often use control plane packets. In a mobile network, the control plane may be responsible for session management, call setup support requirements, interfacing with external servers (e.g., querying for per-user policy and control information), managing high availability for a gateway, and configuring and managing the data plane. Packet overloads on an IP router's control plane can inhibit the routing processes and, as a result, degrade network service levels and user productivity, as well as deny specific users or groups of users' service entirely.

Management plane packets also typically include packets that are generated or received by a network element. This may also include packets generated or received by a management station that are used to manage a network. Management plane packets may also have a receive destination IP address. Examples of protocols that manage a device and/or a network, which may use management plane packets, include Telnet, Secure Shell (SSH), Trivial File Transfer Protocol (TFTP), Simple Network Management Protocol (SNMP), file transfer protocol (FTP), and Network Time Protocol (NTP).

In a 3GPP system, subscriber information is kept by the packet gateway and addressed by way of a mobile node's IP address at the (S)Gi side and GTP tunnel identifier at the 3GPP network side. For instance, in LTE, the P-GW hosts both a mobility anchor point and a service plane for mobile nodes. Similarly, in UMTS, the GGSN provides similar functionality. This subscriber information keeps and maintains charging and policy information, provides a point at which regulatory functions can execute (e.g. lawful intercept) and may provide additional subscriber-specific functions such as Policy Control and Charging (PCC), firewalls, video and HTTP proxies and network address and port translation (NAPT) functions.

Further, 3GPP manages itself by way of bearers or PDP-Contexts. A bearer is an end-to-end connection between a mobile node, (logical) radio channels, and per-bearer GTP tunnels between the RAN and the packet gateway. Moreover, in 3GPP, potentially a mobile node can maintain multiple bearers each pointing to different packet gateways.

The need for operating a web-cache at the cell site at first seems contradictory to the lawful intercept requirement. A web cache at the cell site aims to avoid transmitting data through the cellular packet core, which holds the secure lawful intercept function, while the lawful intercept function requires all data to be sent through the packet core.

Various embodiments described herein provide a procedure by which a secure lawful intercept function operates as required, while allowing data to still be delivered directly from a base station's web or other data cache. Particular embodiments described herein provide for base station web caching with support for lawful intercept functions through HTTP traffic redirection techniques also employed in Content Distribution Network-Interconnect (CDN-I) or other CDN functions. Referring again to FIG. 1, cell site proxy 106 may be deployed as a web proxy for base station 104, and core network proxy 120 may be deployed as a core network web proxy operated "north" of lawful intercept function 116, e.g. between lawful intercept function 116 and Internet 126. In various embodiments, lawful intercept function 116 is configured to understand web requests (e.g. HTTP requests). In particular embodiments, all web operations initiated by a mobile subscriber using user equipment 102 are first directed to core network proxy 120 within mobile packet core network 124, and then redirected by the core network proxy 120 to the base station's cell site proxy 106. Since web requests are first directed to core network proxy 120, lawful intercept function 116 is provided a first opportunity to record the mobile subscriber's web request, including a time stamp and a cell-site identifier, and a second opportunity to record the mobile subscriber's web request by recording the redirection request, such as a CDN/CDN-I redirection request, to cell site proxy 106 operating at cell site 110. Additionally, since the cache fill requests of cell site cache 108 of cell site proxy 106 are routed through lawful intercept function 116 of mobile packet core network 124, the data requested by the mobile subscriber can be captured by lawful intercept function 116 and stored within storage 118.

An example operation of communication system 100 of FIG. 1 in which web caching in a base station at a cell site, a lawful intercept function in the mobile packet core network, and a web cache operated north of the lawful intercept function is described as follows:

A mobile subscriber using user equipment 102 may requests web content by way of sending an HTTP request to a web address: www.web-server.com://foo.html. This web server may be located at remote content server 128. In a case in which the mobile subscriber's actions are subject to interception, lawful intercept function 116 may intercept and record the mobile subscriber's actions within storage 118. Lawful intercept function 116 further records the mobile subscriber's intent to obtain the media file, records a time stamp with the request, requests and records the cell-site identifier for the request, and records a subscriber identifier associated with the subscriber within storage 118. If the mobile subscriber is not subject to interception, lawful intercept function 116 does not record the HTTP operation.

Core network proxy 120 operating as a web proxy between lawful intercept function 116 and the Internet 126 intercepts the web request and re-directs the mobile subscriber to the base station web proxy by way of a HTTP redirect. In other particular embodiments, core network proxy 120 may be located outside of mobile packet core network 124 at a location between lawful intercept function and remote content server 128. Since the redirection request goes through lawful intercept function 116, lawful intercept function 116 has a second opportunity to record the web request with a time stamp and cell-site identifier and/or other information associated with the request if the mobile subscriber is subject to interception.

If cell site proxy 106 has no copy of the requested content data in its associated cell site cache 108, cell site proxy 106 loads the content for www.web-server.com://foo.html either directly from remote content server 128 or from core network cache 122 of core network proxy 120 within mobile packet core network 124. Since this traffic is routed through lawful intercept function 116, lawful intercept function 116 can record the content of the media file in records within storage 118, i.e. lawful intercept function 116 may record all bytes for www.web-server.com://foo.html within storage 118.

If cell site proxy 106 has a copy of the requested content data within cell site cache 108, cell site proxy 106 directly serves the content from cell site cache 108 to the mobile node, i.e. user equipment 102, via base station 104. Since cell site cache 108 of cell site proxy 106 is filled by way of routing the traffic through lawful intercept function 116, lawful intercept function 116 can have obtained a copy of the content beforehand. If lawful intercept function 116 has failed to obtain a copy of the content beforehand, in some embodiments, lawful intercept function 116 may request a copy of the content of www.web-server.com://foo.html by itself.

FIG. 2 is a simplified block diagram illustrating a particular embodiment of base station 104 of communication system 100 of FIG. 1. Base station 104 includes one or more processor(s) 202, a memory element 204, and cell site proxy 106. In the particular embodiment of FIG. 2, cell site proxy 106 is hosted at base station 104, however it should be understood that in other embodiments base station 104 and cell site proxy 106 may be separate network elements, component, or modules. Processor(s) 202 are configured to execute software instructions to perform various operations of base station 104 as described herein. Memory element 204 may be configured to store software instructions and data associated with base station 104. Cell site proxy 106 includes a cell site proxy module 206 and cell site cache 108. Cell site proxy module 206 is configured to implement the various cell site proxy operations as described herein. Cell site cache 108 is configured to store and provide a local copy of content from remote content server 128.

Although the particular embodiment illustrated in FIG. 2 shows base station 104 as including a single node, it should be understood that in other embodiments base station 104 may include any number of nodes. In still other embodiments, a cluster may be formed of any number of processing nodes distributed throughout a number of servers or other network elements within a communication network.

Figure 3:
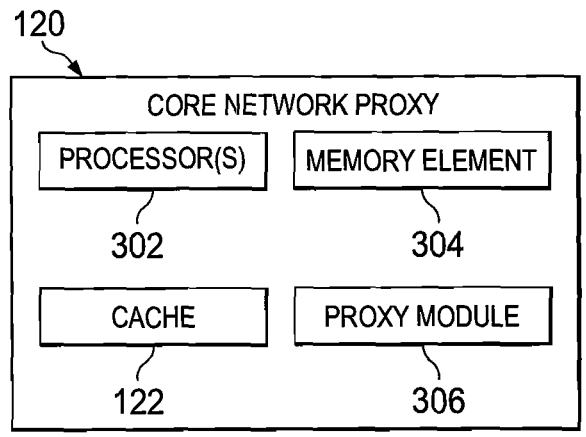
FIG. 3 is a simplified block diagram illustrating a particular embodiment of a core network proxy of the communication system of FIG. 1.

FIG. 3 is a simplified block diagram illustrating a particular embodiment of core network proxy 120 of communication system 100 of FIG. 1. Core network proxy 120 includes one or more processor(s) 302, a memory element 304, core network proxy module 306, and core network cache 122. Processor(s) 302 are configured to execute software instructions to perform various operations of core network proxy 120 as described herein. Memory element 304 may be configured to store software instructions and data associated with core network proxy 120. Core network proxy module 306 is configured to implement the various core network proxy operations as described herein. Core network cache 122 is configured to store and provide a copy of content from remote content server 128 within mobile packet core network 124.

Although the particular embodiment illustrated in FIG. 3 shows core network proxy 120 as including a single node, it should be understood that in other embodiments core network proxy 120 may include any number of nodes. In still other embodiments, a cluster may be formed of any number of processing nodes distributed throughout a number of servers or other network elements within a communication network.

Figure 4:
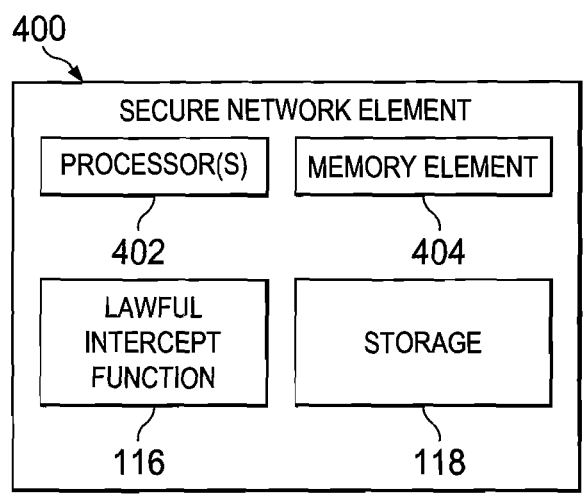
FIG. 4 is a simplified block diagram illustrating a particular embodiment of a secure network element of the communication system of FIG. 1.

FIG. 4 is a simplified block diagram illustrating a particular embodiment of a secure network element 400 of communication system 100 of FIG. 1. Secure network element 400 includes one or more processor(s) 402, a memory element 404, lawful intercept function 116 and storage 118. Processor(s) 402 are configured to execute software instructions to perform various operations of secure network element 400 including providing a secure environment within secure network element 400 for hosting lawful intercept function 116 and secure storage of information within storage 118. Memory element 404 may be configured to store software instructions and data associated with secure network element 400. In one or more embodiments, lawful intercept function 116 is a module or component configured to implement the various lawful intercept operations as described herein. Storage 118 is configured to securely store intercepted and recorded information and content associated with a mobile subscriber's requests for information as described herein.

Although the particular embodiment illustrated in FIG. 4 shows secure network element 400 as including a single node, it should be understood that in other embodiments secure network element 400 may include any number of nodes. In still other embodiments, a cluster may be formed of any number of processing nodes distributed throughout a number of servers or other network elements within a communication network.

Figure 5:
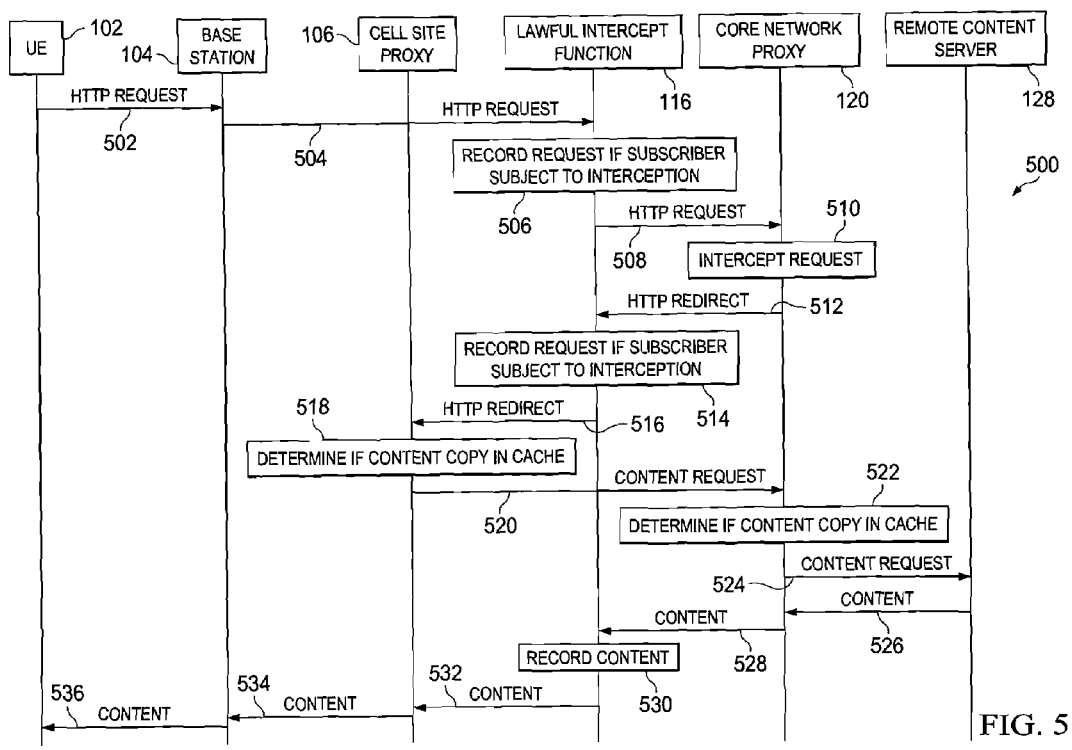
FIG. 5 is a simplified flow diagram illustrating potential operations of the communication system associated with one embodiment of the present disclosure.

Referring now to FIG. 5, FIG. 5 is a simplified flow diagram 500 illustrating potential operations of communication system 100 associated with one embodiment of the present disclosure. In particular, simplified flow diagram 500 illustrates example operations for subscriber dependent redirection between a mobile packet core proxy and a cell site proxy in a network environment. FIG. 5 illustrates flows and operations associated with user equipment 102, base station 104, cell site proxy 106, lawful intercept function 116, core network proxy 120, and remote content server 128. In 502, user equipment (UE) sends a HTTP request which includes a request for content from remote content server 128 to base station 104. In 504, base station 104 forwards the HTTP request which is intercepted by lawful intercept function 116. In 506, lawful intercept function 116 records the request if the subscriber associated with user equipment 102 is subject to interception in a first intercept operation. In one or more embodiments, lawful intercept function 116 records request information associated with the request including one or more of a subscriber identity, the subscriber's intent to obtain the content, a time stamp associated with the request, and a cell site identifier identifying cell site 110. If the mobile subscriber is not subject to interception, lawful intercept function 116 does not record the HTTP request.

In 508, lawful intercept function 116 forwards the HTTP request towards remote content server 128. In 510, core network proxy 120 intercepts the HTTP request. In 512, core network proxy 120 redirects the mobile subscriber to base station 104 by sending an HTTP redirect. In 514, lawful intercept function 116 may once again intercept and record the request including request information such as a time stamp and cell site identifier within storage 118 in a second intercept operation. In 516, lawful intercept function 116 forwards the HTTP redirect towards base station 104. In 518, cell site proxy 106 receives the HTTP redirect and determines if a copy of the content associated with the request is currently within cell site cache 108 of cell site proxy 106. If cell site cache 108 of cell site proxy 106 does not have a copy of the requested content, in 520 cell site proxy 106 sends a content request to core network proxy 120. If the content is available in the cell-site cache, the content is provided to user equipment 102 from the cell-site cache. The content request is a request to provide the requested content associated with remote content server 128.

In 522, core network proxy 120 determines if a copy of the content is stored within core network cache 122. If core network cache 122 does not include a copy of the requested content, in 524 core network sends a content request to remote content sever 128 requesting the content, and in 526 remote content server 128 responds with the requested content. If core network cache 122 does have a copy of the content or if core network proxy 120 has received the requested content from remote content server 128, in 528 core network proxy 120 sends the content towards cell site proxy 106. In 530, lawful intercept function 116 intercepts the requested content and records the requested content in storage 118 in a third interception operation. For example, lawful intercept function 116 may store media content such as video and audio associated with the request within storage 118.

In 532, lawful intercept function 116 forwards the requested content to cell site proxy 106. In 534, cell site proxy 106 forwards the requested content to base station 104. In 536, base station 104 sends the requested content to user equipment 102. User equipment 102 may then present the requested content to the mobile subscriber.

Figure 6:
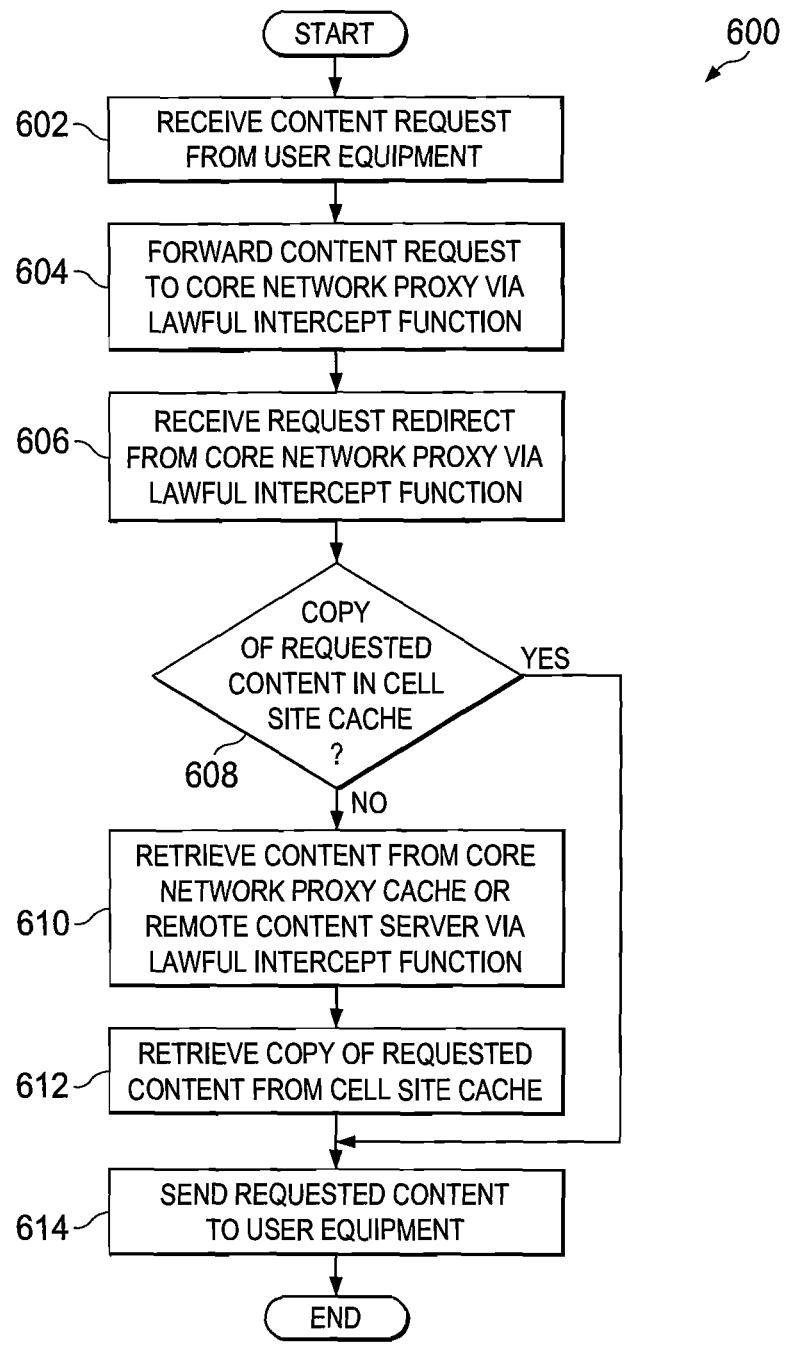
FIG. 6 is a simplified flow diagram illustrating potential operations associated with the cell site proxy according to one embodiment of the present disclosure.

Referring now to FIG. 6, FIG. 6 is a simplified flow diagram 600 illustrating potential operations associated with cell site proxy 106 according to one embodiment of the present disclosure. In a particular embodiment, cell site proxy 106 resides within or is associated with an access network such as a radio access network. In 602, cell site proxy 106 receives a content request from user equipment 102. In one or more embodiments, the content request includes a request for content from remote content server 128 and may include a subscriber identifier associated with user equipment 102. In a particular embodiment, subscriber information including the subscriber identifier may be obtained from a Policy and Charging Rules Function (PCRF) based on the IP address of the user equipment/mobile node. In 604, cell site proxy 106 forwards the content request to core network proxy 120 via lawful intercept function 116. Lawful intercept function 116 may intercept the content request if the subscriber identifier indicates that the subscriber is subject to interception, record/store request information associated with the request, and forward the request to core network proxy 120. Core network proxy 120 may intercept the request, generate a request redirect message, and send the request redirect message to cell site proxy 106. Lawful intercept function 116 may intercept the request redirect message from core network proxy 120, record/store request information associated with the request redirect, and forward the request redirect to cell site proxy 106. In 606, cell site proxy 106 receives the request redirect from core network proxy 120 via lawful intercept function 116. In 608, cell site proxy 106 determines whether a copy of the requested content is in cell site cache 108.

If a copy of the requested content is not in cell site cache 608, in 610 cell site proxy 106 retrieves the content from either core network proxy cache 122 of core network proxy 120 or remote content server 128 via lawful intercept function 116. In one or more embodiments, lawful intercept function 116 may record the requested content in storage 118 before forwarding the requested content to cell site proxy 106. In 612, cell site proxy 106 retrieves a copy of the requested content from cell site cache 108. In 614, cell site proxy 106 sends the copy of the requested content to user equipment 112 and the operations end. If in 608, cell site proxy 106 determines that a copy of the requested content is in cell site cache 108, cell site proxy 106 retrieves and sends the copy of the requested content to user equipment 102 and the operations end.

Figure 7B:
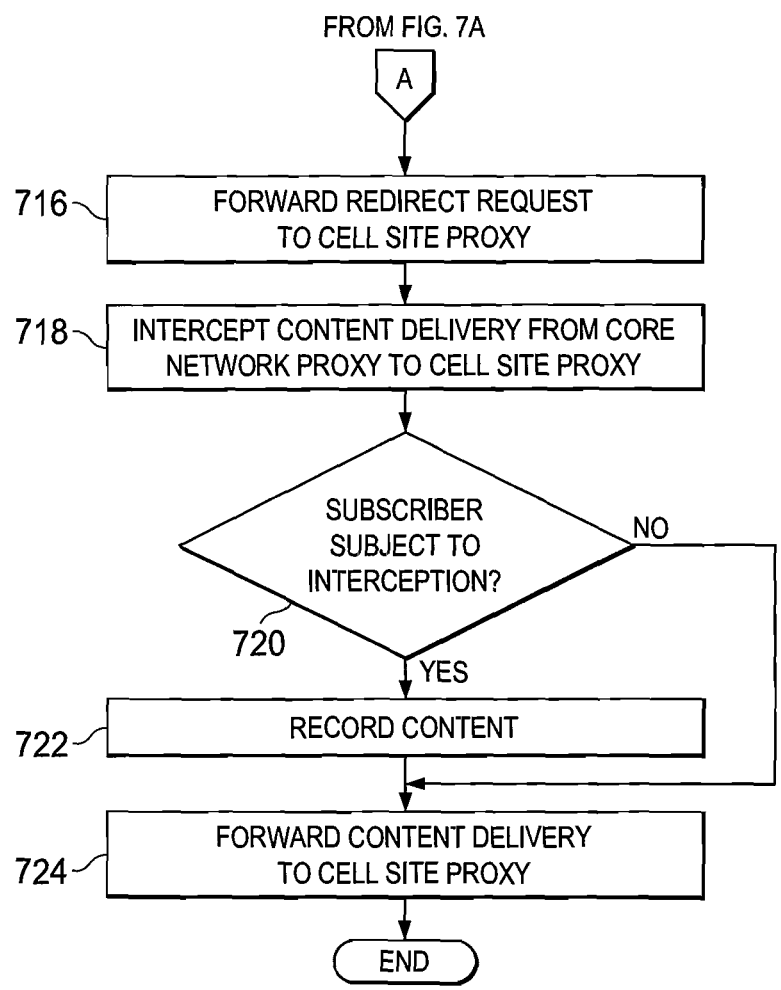

Referring now to FIGS. 7A-7B, FIGS. 7A-7B are a simplified flow diagram 700 illustrating potential operations associated with lawful intercept function 116 according to one embodiment of the present disclosure. In a particular embodiment, lawful intercept function 116 is located in mobile packet core network 124. In 702, lawful intercept function 116 intercepts a content request sent from cell site proxy 106 to core network proxy 120. In one or more embodiments, user equipment 102 originates the content request and transmits the content request to cell site proxy 106 via base station 104. In one or more embodiments, the content request includes a user identifier or subscriber identifier identifying a subscriber associated with user equipment 102. In 704, lawful intercept function 116 determines whether the subscriber is subject to interception. In a particular embodiment, lawful intercept function 116 determines whether the subscriber is subject to interception based upon the subscriber identifier.

If the subscriber is subject to interception, in 706 lawful intercept function 116 records/stores request information associated with the request including one or more of the remote server network address associated with the requested content, a time stamp associated with the request, a cell-site identifier associated with the request and the subscriber identifier in storage 118 and the operations continue to 708. If lawful intercept function 116 determines in 704 that the subscriber is not subject to interception, the operations also continue to 708. In 708, lawful intercept function 116 forwards the request to core network proxy 120. In 710, lawful intercept function 116 intercepts a request redirect from core network proxy 122 to cell site proxy 106. In 712, lawful intercept function 116 determines whether the subscriber is subject to interception. If the subscriber is subject to interception, the operations continue to 714 in which lawful intercept function 116 records/stores request information regarding the request once again in storage 118, and the operations continue to 716. If in 712, lawful intercept function 116 determines that the subscriber is not subject to interception the operations also continue to 716. In 716, lawful intercept function 116 forwards the redirect requests to cell site proxy 106. Cell site proxy 106 may then determine if a copy of the requested content is in cell site cache 108, and request the content from either core network proxy 120 or remote content server 128. In 718, lawful intercept function 116 intercepts content delivery from core network proxy 120 to cell site proxy 106.

In 720, lawful intercept function 116 determines whether the subscriber is subject to interception. If the subscriber is subject to interception, the operations continue to 722 in which lawful intercept function 116 records the requested content in storage 118, and the operations continue to 724. If in 720, lawful intercept function 116 determines that the subscriber is not subject to interception the operations also continue to 724. In 724, lawful intercept function 116 forwards the content delivery to cell site proxy 106. The cell site proxy 106 may then provide the requested content to user equipment 102 via base station 104. The operations then end.

Figure 8:
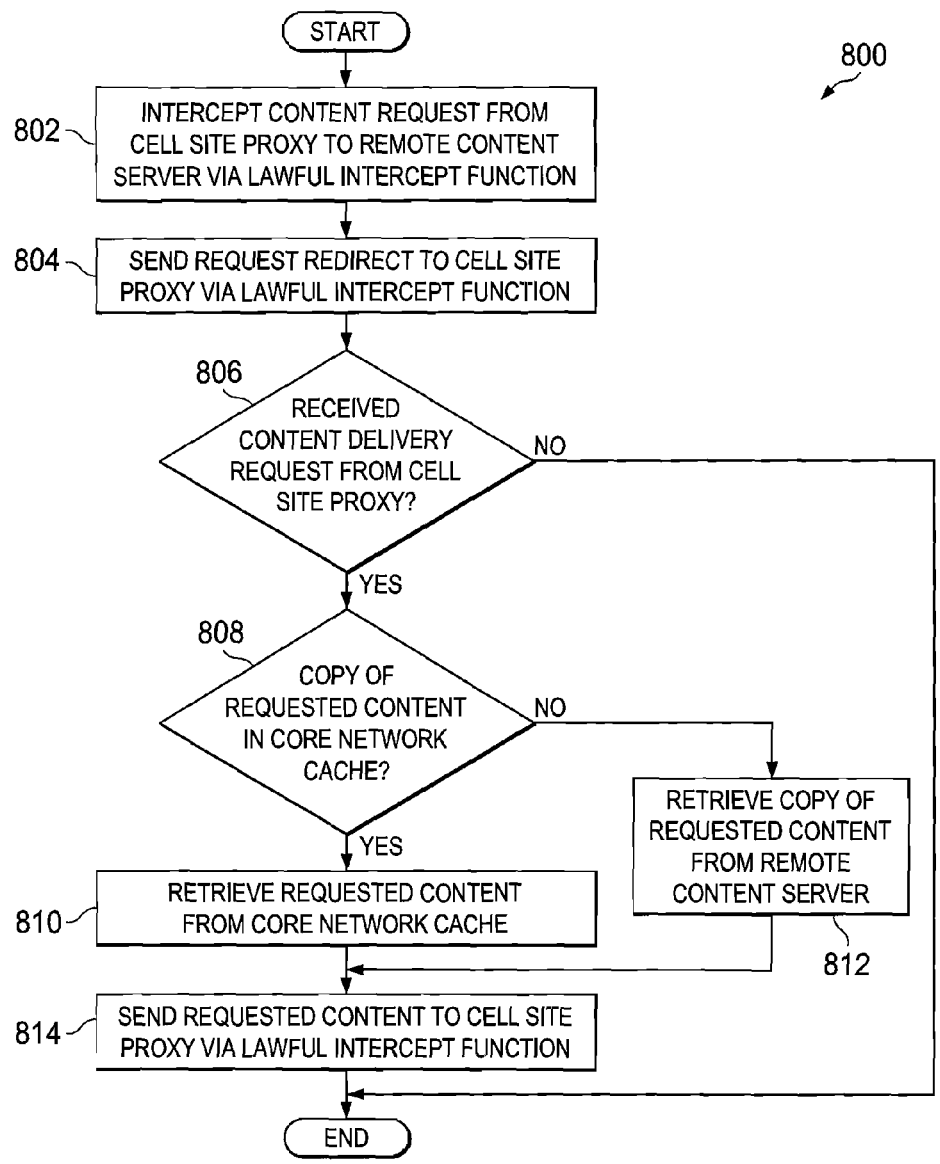
FIG. 8 is a simplified flow diagram illustrating potential operations associated with core network proxy according to one embodiment of the present disclosure.

Referring now to FIG. 8, FIG. 8 is a simplified flow diagram 800 illustrating potential operations associated with core network proxy 120 according to one embodiment of the present disclosure. In a particular embodiment, core network proxy 120 is located in mobile packet core network 124. In 802, core network proxy 120 intercepts a content request from cell site proxy 106 to remote content server 128 via lawful intercept function 116 which has previously intercepted the request. In one or more embodiments, the content request is generated by user equipment 102 and sent to base station 104, and base station 104 sends the content request to cell site proxy 106. In 804, core network proxy 120 sends a request redirect to cell site proxy 118 via lawful intercept function 116. By sending the request redirect, core network proxy 120 redirects the content request from cell site proxy 106 back to cell site proxy 106 which passes through lawful intercept function 116. Lawful intercept function may intercept the request redirect and record/store request information about the redirect before forwarding the request redirect to cell site proxy 106. In 806, core network proxy 120 determines whether it has received a content delivery request from cell site proxy 106. If core network proxy 120 determines that it has not received a content delivery request from cell site proxy 106, the operations end. This may be due to cell site proxy 106 already having a copy of the requested content within cell site cache 108 and being able to deliver the requested content to user equipment 102 directly from cell site cache 108 instead of being required to retrieve the requested content from core network proxy 120 or remote content server 128.

If core network proxy 120 determines that it has received a content delivery request from cell site proxy 106, the operations continue to 808. In 808, core network proxy 120 determines whether the requested content is in core network cache 122. If a copy of the requested content is in core network cache 122, in 810 core network proxy 120 retrieves the requested content from core network cache 122. If a copy of the requested content is not in core network cache 122, in 812, core network proxy 120 retrieves a copy of the requested content from remote content server 812. In 814, core network proxy 120 sends the requested content to cell site proxy 106 via lawful intercept function 814 in response to a request by cell site proxy 106 such that core network proxy 120 may serve as a cache for requests from cell site proxy 106. Lawful intercept function 814 may intercept and record/store the requested content before forwarding the request content to cell site proxy 106. Cell site proxy 106 may then send the requested content to user equipment 102 via base station 104. User equipment 102 may then present the requested content to the subscriber. After 814, the operations end.

Note that in certain example implementations, the functions outlined herein may be implemented by logic encoded in one or more tangible media (e.g., embedded logic provided in an application specific integrated circuit [ASIC], network processors, digital signal processor [DSP] instructions, software [potentially inclusive of object code and source code] to be executed by a processor, or other similar machine, etc.). In some of these instances, a memory element (as shown in FIG. 2, FIG. 3 and FIG. 4) can store data used for the operations described herein. This includes the memory element being able to store software, logic, code, or processor instructions that are executed to carry out the activities described in this Specification.

A processor can execute any type of instructions associated with the data to achieve the operations detailed herein in this Specification. In one example, the processor (as shown in FIG. 2, FIG. 3 and FIG. 4) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, cell site proxy 106, lawful intercept function 116, and core network proxy 120 may include software in order to achieve the data communication functions outlined herein. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, tables, trees, queues, caches, etc.) should be construed as being encompassed within the broad term 'memory element.' Similarly, any of the potential processing elements, modules, and machines described in this Specification should be construed as being encompassed within the broad term 'processor.' Each of these elements can also include suitable interfaces for receiving, transmitting, and/or otherwise communicating data or information in a network environment.

Cell site proxy 106, lawful intercept function 116, and core network proxy 120 may be network elements configured to perform the activities disclosed herein. As used herein in this Specification, the term 'network element' may include any suitable hardware, software, components, modules, interfaces, or objects operable to exchange information in a network environment. Further, the term network element as discussed herein encompasses (but is not limited to) devices such as routers, switches, gateways, bridges, loadbalancers, firewalls, inline service nodes, proxies, clients, servers processors, modules, or any other suitable device, component, element, proprietary device, network appliance, or object operable to exchange information in a network environment. This may be inclusive of appropriate algorithms and communication protocols that allow for the effective exchange of data or information.

In certain embodiments, cell site proxy 106 may be implemented as a service or application in a client module disposed within base station 104 at cell site 110. In some embodiments, core network proxy 120 may be implemented as a service or application in a director module within mobile packet core network 124.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible scenarios and patterns that may be executed by, or within, communication system 100. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. It is also imperative to note that the architecture outlined herein can be used in different types of network applications. The architecture of the present disclosure can readily be used such environments, as the teachings of the present disclosure are equally applicable to all such alternatives and permutations.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, by a first proxy within an access network, a first request for content associated with a remote server, the first request including a subscriber identifier associated with a subscriber;
   sending the first request to a second proxy within a core network, the first request being intercepted by an intercept function within the core network in a first intercept operation, the intercept function configured to forward the first request to the second proxy; and
   receiving a redirect from the second proxy, the redirect configured to redirect the first request to the first proxy, the redirect being intercepted by the intercept function in a second intercept operation, the intercept function configured to forward the redirect to the first proxy.

2. The method of claim 1, wherein the first intercept operation includes:
   determining if the subscriber is subject to interception; and
   recording request information associated with the request if the subscriber is subject to interception.

3. The method of claim 2, wherein the determining if the subscriber is subject to interception is based upon the subscriber identity.

4. The method of claim 2, wherein the request information includes at least one of the subscriber identity, a time stamp associated with the request, and a cell site identifier identifying a cell site associated with the first proxy.

5. The method of claim 1, wherein the first proxy includes a cache configured to store content from the remote server.

6. The method of claim 5, comprising:
   determining if the requested content is found in the cache; and
   sending the content from the cache to user equipment associated with the subscriber identity if the requested content is found in the cache.

7. The method of claim 1, further comprising:
   receiving the requested content from the second proxy, the requested content being intercepted by the intercept function in a third intercept operation, the intercept function being configured to forward the requested content to the first proxy.

8. The method of claim 7, wherein the third intercept operation includes:
   determining if the subscriber is subject to interception; and
   recording the requested content if the subscriber is subject to interception.

9. The method of claim 1, wherein the first proxy is a web proxy.

10. One or more non-transitory tangible media that includes code for execution and when executed by a processor operable to perform operations comprising:
    receiving, by a first proxy within an access network, a first request for content associated with a remote server, the first request including a subscriber identifier associated with a subscriber;
    sending the first request to a second proxy within a core network, the first request being intercepted by an intercept function within the core network in a first intercept operation, the intercept function configured to forward the first request to the second proxy; and receiving a redirect from the second proxy, the redirect configured to redirect the first request to the first proxy, the redirect being intercepted by the intercept function in a second intercept operation, the intercept function configured to forward the redirect to the first proxy.

11. The media of claim 10, wherein the first intercept operation includes:

determining if the subscriber is subject to interception; and
recording request information associated with the request if the subscriber is subject to interception.

12. The media of claim 11, wherein the determining if the subscriber is subject to interception is based upon the subscriber identity.

13. The media of claim 11, wherein the request information includes at least one of the subscriber identity, a time stamp associated with the request, and a cell site identifier identifying a cell site associated with the first proxy.

14. The media of claim 10, wherein the first proxy includes a cache configured to store content from the remote server.

15. The media of claim 14, wherein the operations further include:

determining if the requested content is found in the cache; and
sending the content from the cache to user equipment associated with the subscriber identity if the requested content is found in the cache.

16. The media of claim 10, wherein the operations further include:

receiving the requested content from the second proxy, the requested content being intercepted by the intercept function in a third intercept operation, the intercept function being configured to pass the requested content to the first proxy.

17. The media of claim 16, wherein the third intercept operation includes:

determining if the subscriber is subject to interception; and
recording the requested content if the subscriber is subject to interception.

18. The media of claim 10, wherein the first proxy is a web proxy.

19. An apparatus, comprising:

a memory element configured to store data,
a processor operable to execute instructions associated with the data, and
the processor being configured to:
receive, by a first proxy within an access network, a first request for content associated with a remote server, the first request including a subscriber identifier associated with a subscriber;
send the first request to a second proxy within a core network, the first request being intercepted by an intercept function within the core network in a first intercept operation, the intercept function configured to forward the first request to the second proxy; and
receive a redirect from the second proxy, the redirect configured to redirect the first request to the first proxy, the redirect being intercepted by the intercept function in a second intercept operation, the intercept function configured to forward the redirect to the first proxy.

20. The apparatus of claim 19, wherein the first intercept operation includes:

determining if the subscriber is subject to interception; and
recording request information associated with the request if the subscriber is subject to interception.

21. The apparatus of claim 19, further comprising a cache configured to store content from the remote server.

22. The apparatus of claim 21, wherein the processor is further configured to:

determine if the requested content is found in the cache; and
send the content from the cache to user equipment associated with the subscriber identity if the requested content is found in the cache.

23. The apparatus of claim 19, wherein the processor is further configured to:

receive the requested content from the second proxy, the requested content being intercepted by the intercept function in a third intercept operation, the intercept function being configured to pass the requested content to the first proxy.

24. The apparatus of claim 23, wherein the third intercept operation includes:

determining if the subscriber is subject to interception; and
recording the requested content if the subscriber is subject to interception.

25. A method, comprising:

intercepting, by a first proxy in a core network, a first request for content from a second proxy within an access network, the first request including a request for content from a remote server and a subscriber identifier associated with a subscriber, the first request being intercepted by an intercept function within the core network in a first intercept operation, the intercept function being configured to forward the first request to the first proxy; and
sending a redirect to the second proxy, the redirect configured to redirect the first request to the second proxy, the redirect being intercepted by the intercept function in a second intercept operation, the intercept function configured to forward the redirect to the second proxy.

26. The method of claim 25, wherein the first intercept operation includes:

determining if the subscriber is subject to interception; and
recording request information associated with the request if the subscriber is subject to interception.

27. The method of claim 26, wherein the determining if the subscriber is subject to interception is based upon the subscriber identity.

28. The method of claim 26, wherein the request information includes at least one of the subscriber identity, a time stamp associated with the request, and a cell site identifier identifying a cell site associated with the first proxy.

29. The method of claim 25, wherein the first proxy includes a cache configured to store content from the remote server.

30. The method of claim 29, further comprising:

determining if the requested content is found in the cache; and
receiving the requested content from the remote server if the requested content is not found in the cache.

31. The method of claim 25, further comprising:

sending the requested content to the second proxy, the requested content being intercepted by the intercept function in a third intercept operation, the intercept function being configured to pass the requested content to the second proxy.

32. The method of claim 31, wherein the third intercept operation includes:

determining if the subscriber is subject to interception; and
recording the requested content if the subscriber is subject to interception.

33. The method of claim 25, wherein the first proxy is a web proxy.

34. One or more non-transitory tangible media that includes code for execution and when executed by a processor operable to perform operations comprising:
  intercepting, by a first proxy in a core network, a first request for content from a second proxy within an access network, the first request including a request for content from a remote server and a subscriber identifier associated with a subscriber, the first request being intercepted by an intercept function within the core network in a first intercept operation, the intercept function being configured to forward the first request to the first proxy; and
  sending a redirect to the second proxy, the redirect configured to redirect the first request to the second proxy, the redirect being intercepted by the intercept function in a second intercept operation, the intercept function configured to forward the redirect to the second proxy.

35. The media of claim 34, wherein the first intercept operation includes:
  determining if the subscriber is subject to interception; and
  recording request information associated with the request if the subscriber is subject to interception.

36. The media of claim 34, wherein the first proxy includes a cache configured to store content from the remote server.

37. The media of claim 36, wherein the operations further include:
  determining if the requested content is found in the cache; and
  receiving the requested content from the remote server if the requested content is not found in the cache.

38. The media of claim 34, wherein the operations further include:
  sending the requested content to the second proxy, the requested content being intercepted by the intercept function in a third intercept operation, the intercept function being configured to forward the requested content to the second proxy.

39. The media of claim 38, wherein the third intercept operation includes:
  determining if the subscriber is subject to interception; and
  recording the requested content if the subscriber is subject to interception.

40. An apparatus, comprising:
  a memory element configured to store data,
  a processor operable to execute instructions associated with the data, and
  the processor being configured to:
    intercept, by a first proxy in a core network, a first request for content from a second proxy within an access network, the first request including a request for content from a remote server and a subscriber identifier associated with a subscriber, the first request being intercepted by an intercept function within the core network in a first intercept operation, the intercept function being configured to forward the first request to the first proxy; and
    send a redirect to the second proxy, the redirect configured to redirect the first request to the second proxy, the redirect being intercepted by the intercept function in a second intercept operation, the intercept function configured to forward the redirect to the second proxy.

41. The apparatus of claim 40, wherein the first intercept operation includes:
  determining if the subscriber is subject to interception; and
  recording request information associated with the request if the subscriber is subject to interception.

42. The apparatus of claim 40, wherein the apparatus further includes a cache configured to store content from the remote server.

43. The apparatus of claim 42, wherein the processor is further configured to:
  determine if the requested content is found in the cache; and
  receive the requested content from the remote server if the requested content is not found in the cache.

44. The apparatus of claim 43, wherein the processor is further configured to:
  send the requested content to the second proxy, the requested content being intercepted by the intercept function in a third intercept operation, the intercept function being configured to pass the requested content to the second proxy.

45. The apparatus of claim 44, wherein the third intercept operation includes:
  determining if the subscriber is subject to interception; and
  recording the requested content if the subscriber is subject to interception.

46. A method, comprising:
  intercepting, by a first proxy in a core network, a first request for content from a second proxy within an access network, the first request including a request for content from a remote server and a subscriber identifier associated with a subscriber, the first request being intercepted by an intercept function within the core network in a first intercept operation, the intercept function being configured to forward the first request to the first proxy; and
  sending an Hypertext Transfer Protocol (HTTP) redirect to the second proxy, the HTTP redirect configured to redirect the first request to the second proxy, the HTTP redirect being intercepted by the intercept function in a second intercept operation, the intercept function configured to forward the HTTP redirect to the second proxy.

47. The method of claim 46, wherein the first intercept operation includes:
  determining if the subscriber is subject to interception; and
  recording request information associated with the request if the subscriber is subject to interception.

48. The method of claim 46, further comprising:
  sending the requested content to the second proxy, the requested content being intercepted by the intercept function in a third intercept operation, the intercept function being configured to pass the requested content to the second proxy.

* * * * *